United States Patent
Watanabe

(10) Patent No.: US 11,151,242 B2
(45) Date of Patent: Oct. 19, 2021

(54) SERVER AND NON-TRANSITORY COMPUTER-READABLE MEDIUM HAVING INSTRUCTIONS

(71) Applicant: BROTHER KOGYO KABUSHIKI KAISHA, Nagoya (JP)

(72) Inventor: Satoshi Watanabe, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 502 days.

(21) Appl. No.: 15/938,146

(22) Filed: Mar. 28, 2018

(65) Prior Publication Data
US 2018/0285557 A1    Oct. 4, 2018

(30) Foreign Application Priority Data
Mar. 30, 2017   (JP) .............................. JP2017-068825

(51) Int. Cl.
*G06F 21/45* (2013.01)
*H04L 29/12* (2006.01)

(52) U.S. Cl.
CPC .......... *G06F 21/45* (2013.01); *H04L 61/2007* (2013.01); *G06F 2221/2117* (2013.01); *H04L 61/103* (2013.01); *H04L 61/2015* (2013.01); *H04L 61/2038* (2013.01); *H04L 61/6022* (2013.01)

(58) Field of Classification Search
CPC ............. G06F 21/45; G06F 2221/2117; H04L 61/2007; H04L 61/103; H04L 61/6022
USPC .......................................................... 726/6
See application file for complete search history.

(56) References Cited

U.S. PATENT DOCUMENTS

| 3,556,120 | A  | * | 1/1971  | Bauer ....................... F15C 1/22 137/804 |
| 8,332,591 | B2 | * | 12/2012 | Chung ................ G06F 12/0804 711/143 |
| 9,571,480 | B1 | * | 2/2017  | Asveren ............ H04W 12/0608 |
| 2004/0150546 | A1 | * | 8/2004 | Choi ...................... H04L 12/282 341/176 |
| 2005/0060585 | A1 | * | 3/2005 | Murakoshi ............ H04L 63/101 726/4 |

(Continued)

FOREIGN PATENT DOCUMENTS

JP          2010-034853 A    2/2010

*Primary Examiner* — Saleh Najjar
*Assistant Examiner* — Peiliang Pan
(74) *Attorney, Agent, or Firm* — Scully, Scott, Murphy & Presser, PC

(57) ABSTRACT

A server includes a controller performs determining whether a first local area network and a second local area network match; determining, in a case where the first login request is received and in a case where the first registration request is received, whether the first function execution device satisfies the first registration condition; and registering by: controlling, in a case where the first local area network and the second local area network match and the first function execution device satisfies the first registration condition, to register the first identification information; wherein, in a case where the first local area network and the second local area network do not match, the first identification information is not registered; and wherein, in a case where the first function execution device does not satisfy the first registration condition, the first identification information is not registered.

14 Claims, 9 Drawing Sheets

(56) References Cited

U.S. PATENT DOCUMENTS

| | | | | |
|---|---|---|---|---|
| 2007/0011354 A1* | 1/2007 | Ohara | ............... | G06F 3/1222 |
| | | | | 709/245 |
| 2009/0079490 A1* | 3/2009 | Falter | ............... | H02M 3/158 |
| | | | | 327/434 |
| 2009/0109478 A1* | 4/2009 | Maeda | ............... | G06Q 10/06 |
| | | | | 358/1.15 |
| 2011/0125891 A1* | 5/2011 | Kawai | ............... | F24F 11/30 |
| | | | | 709/223 |
| 2011/0320881 A1* | 12/2011 | Dodson | ............... | G06F 11/2005 |
| | | | | 714/43 |
| 2012/0014299 A1* | 1/2012 | Yoon | ............... | H04L 63/18 |
| | | | | 370/310 |
| 2012/0133973 A1* | 5/2012 | Ito | ............... | G06F 3/1203 |
| | | | | 358/1.15 |
| 2014/0133694 A1* | 5/2014 | Mishra | ............... | H04N 1/00129 |
| | | | | 382/100 |
| 2014/0331189 A1* | 11/2014 | Lee | ............... | G06F 3/04883 |
| | | | | 715/863 |
| 2015/0002884 A1* | 1/2015 | Okumura | ............... | G06F 3/1203 |
| | | | | 358/1.14 |
| 2015/0047009 A1* | 2/2015 | Sone | ............... | H04L 63/0272 |
| | | | | 726/11 |
| 2016/0011830 A1* | 1/2016 | Asakura | ............... | G06F 3/1292 |
| | | | | 358/1.15 |
| 2016/0154955 A1* | 6/2016 | Motoe | ............... | G06F 21/31 |
| | | | | 726/19 |
| 2016/0192411 A1* | 6/2016 | Mori | ............... | H04W 8/06 |
| | | | | 370/329 |
| 2017/0006471 A1* | 1/2017 | Kim | ............... | H04W 12/06 |

* cited by examiner

SERVER AND NON-TRANSITORY COMPUTER-READABLE MEDIUM HAVING INSTRUCTIONS

CROSS-REFERENCE TO RELATED APPLICATION

This application claims priority from Japanese Patent Application No. 2017-068825 filed on Mar. 30, 2017, the entire subject matter of which is incorporated herein by reference.

TECHNICAL FIELD

This specification discloses a technique relating to a server that registers identification information for identifying a function execution device.

BACKGROUND

The background art discloses a remote management server for registering a MAC address of an air conditioner. The remote management server receives MAC addresses and global IP (abbreviation of Internet Protocol) addresses of plural air conditioners respectively and provisionally registers the MAC addresses and the global IP addresses. A user operates an initialization personal computer and logs into the remote management server using a user ID. In a case where the remote management server acquires a GIP address of the initialization personal computer from the initialization personal computer, each of the air conditioners belonging to the same LAN (abbreviation of Local Area Network) as the initialization personal computer is detected with reference to the GIP address of the initialization personal computer and the provisionally registered GIP address of each of the plural air conditioners. The remote management server definitively registers the detected MAC address of each of the air conditioners in association with the user ID.

SUMMARY

This specification discloses a technique for registering identification information for identifying a function execution device in a server.

A server according to one aspect of this specification includes: a controller;
a memory storing first authentication information and first condition information in association with each other, the first condition information indicating a first registration condition for registering a function execution device; the controller configured to perform: receiving, in response to that the first authentication information is transmitted from a first terminal device, through the Internet, a first login request including the first authentication information and a first global IP address, the first global IP address corresponding to a first local area network, the first terminal device belonging to the first local area network; receiving, in response to that first identification information for identifying a first function execution device is transmitted from the first function execution device, through the Internet, a first registration request including the first identification information and a second global IP address, the second global IP address corresponding to a second local area network, the first function execution device belonging to the second local area network; determining, in a case where the first login request is received and in a case where the first registration request is received, whether or not the first local area network and the second local area network match with each other based on the first global IP address included in the first login request and the second global IP address included in the first registration request; determining, in a case where the first login request is received and in a case where the first registration request is received, whether or not the first function execution device satisfies the first registration condition based on the first condition information, the first condition information being stored in the memory in association with the first authentication information included in the first login request; and registering, in a case where it is determined that the first local area network and the second local area network match with each other and the first function execution device satisfies the first registration condition, the first identification information included in the first registration request in the memory in association with the first authentication information, wherein, in a case where it is determined that the first local area network and the second local area network do not match with each other, the first identification information is not registered in the memory, and wherein, in a case where it is determined that the first function execution device does not satisfy the first registration condition, the first identification information is not registered in the memory.

According to the above-described configuration, the server does not automatically register the first identification information of the first function execution device belonging to the same local area network as the first terminal device, but changes whether or not the first identification information is to be registered depending on whether or not the first function execution device satisfies the first registration condition. Accordingly, the server can appropriately execute the registration according to the first registration condition.

A server according to another aspect includes a controller; memory storing first authentication information; the controller configured to perform: receiving, in response to that the first authentication information is transmitted from a first terminal device, through the Internet, a first login request including the first authentication information and a first global IP address, the first global IP address corresponding to a first local area network, the first terminal device belonging to the first local area network; receiving, in response to that first identification information for identifying a first function execution device is transmitted from the first function execution device after the first login request is received, through the Internet, a first registration request including the first identification information and a second global IP address, the second global IP address corresponding to a second local area network, the first function execution device belonging to the second local area network; determining, in a case where the first login request is received and in a case where the first registration request is received, whether or not the first local area network and the second local area network match with each other based on the first global IP address included in the first login request and the second global IP address included in the first registration request; registering, in a case where it is determined that the first local area network and the second local area network match with each other, the first identification information included in the first registration request in the memory in association with the first authentication information, wherein, in a case where it is determined that the first local area network and the second local area network do not match with each other, the first identification information is not registered in the memory; receiving, through the Internet in a case where second identification information for identifying a second function execution device is transmitted from the second function execution device after the first login request is received, a second registration request, the second registration request including the second identification information and a specific global IP address, a specific global IP address corresponding to a specific local area network, the second function execution device belonging to the specific local area network; and determining, in a case where the first login request and the second registration request are received, whether or not the first local area network and the specific local area network match with each other based on the first global IP address included in the first login request and the specific global IP address included in the second registration request; and wherein, in a case where it is determined that the first local area network and the specific local area network match with each other, the second identification information included in the second registration request is registered in the memory in association with the first authentication information, wherein, in a case where it is determined that the first local area network and the specific local area network do not match with each other, the second identification information is not registered in the memory.

According to the above-described configuration, the server receives the first and second registration requests after receiving the first login request. As a result, the first and second identification information can be registered. Accordingly, the server can reduce the amount of information to be stored in the memory as compared to a configuration in which the first and second registration requests are received before receiving the first login request.

A control method and a computer program of realizing the server, and a computer-readable storage medium storing the computer program are also novel and useful. In addition, a communication system including the server and at least one other device (for example, the first terminal device, the first function execution device, or the second function execution device) is also novel and useful.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

First Embodiment

Figure 1:
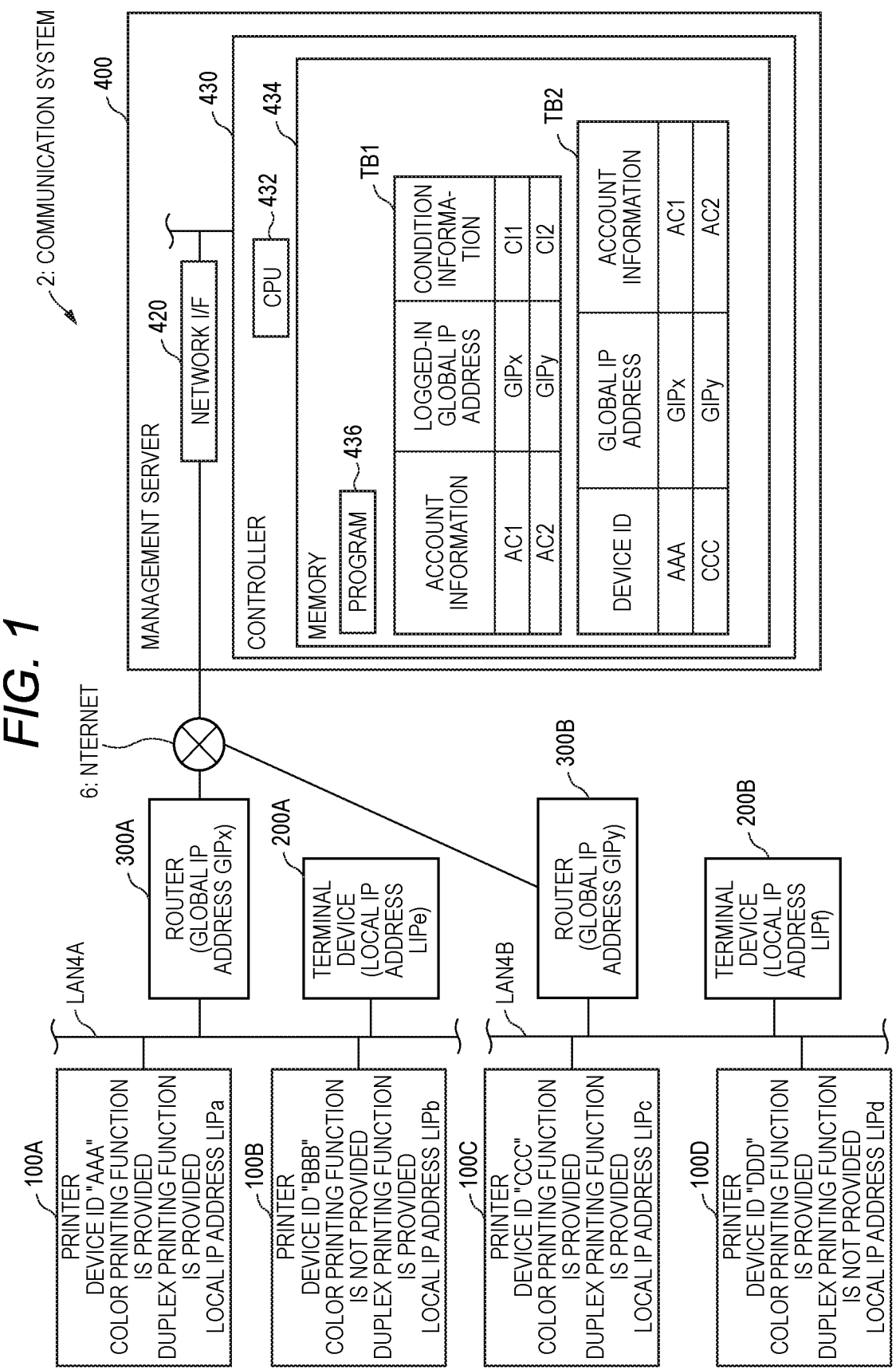
FIG. 1 is a diagram illustrating a configuration of a communication system.

Configuration of Communication System 2: FIG. 1

A configuration of a communication system 2 will be described with reference to FIG. 1. The communication system 2 includes plural printers 100A to 100D, plural terminal devices 200A and 200B, and a management server 400. Each of the devices 100A, 100B, and 200A is connected to a LAN 4A as a wired LAN or a wireless LAN that is constructed in, for example, a first company. The LAN 4A is connected to the Internet 6 through a router 300A. In addition, each of the devices 100C, 100D, and 200B is connected to a LAN 4B as a wired LAN or a wireless LAN that is constructed in, for example, a second company different from the first company. The LAN 4B is connected to the Internet 6 through a router 300B. Hereinafter, each of employees of the first company and each of employees of the second company will be called "first user" and "second user", respectively. In addition, the management server 400 can communicate with each of the devices 100A to 100D, 200A, and 200B through the Internet 6.

Configurations of Printers 100A to 100D

Each of the printers 100A to 100D is a peripheral (that is, a peripheral of the terminal devices 200A and 200B) having a printing function. A device ID "AAA" and a local IP address LIPa are assigned to the printer 100A. The device ID is unique identification information for identifying a printer. The local IP address is an IP address according to the IPv4 (abbreviation of Internet Protocol Version 4) and is an IP address for identifying a device (that is, a printer or a terminal device) in the LAN. The local IP address may be assigned by a manager of the LAN, or may be assigned by an IP address assignment server such as a DHCP (abbreviation of a dynamic host configuration protocol) server.

Devices IDs "BBB", "CCC", and "DDD" and local IP addresses LIPb, LIPc, and LIPd are assigned to the printers 100B, 100C, and 100D, respectively. Hereinafter, the local IP address will also be referred to as "LIP address", and the local IP address LIPa (or LIPb or the like) will also be simply referred to as "LIPa (or LIPb or the like)".

The printers 100A and 100C are first models that can execute a color printing function and a duplex printing function. The printer 100B is a second model that cannot execute the color printing function and can execute the duplex printing function. The printer 100D is a third model that can execute the color printing function and cannot execute the duplex printing function.

Configurations of Terminal Devices 200A and 200B

Each of the terminal devices 200A and 200B may be a stationary device such as a desktop PC, or may be a portable device such as a laptop, a tablet PC, or a smartphone. A local IP address LIPe is assigned to the terminal device 200A. A local IP address LIPf is assigned to the terminal device 200B.

Configurations of Routers 300A and 300B

A global IP address GIPx is assigned to the router 300A. The global IP address is an IP address for identifying a LAN on the Internet 6. A global IP address GIPy is assigned to the router 300B. Hereinafter, the global IP address will be referred to as "GIP address", and the global IP address GIPx (or GIPy) will also be simply referred to as "GIPx (or GIPy)".

The router 300A relays communication between the devices 100A and the like in the LAN 4A and the Internet 6 (for example, the management server 400). For example, when a request to be transmitted from the printer 100A to the management server 400 is received, the router 300A stores a request identifier for identifying the request and LIPa of the printer 100A included in the request in association with each other. The router 300A converts LIPa of the printer 100A into GIPx of the LAN 4A, and transmits the request including the request identifier and GIPx to the management server 400. The router 300A receives a response in which GIPx is designated as a destination from the management server 400. The response includes the request identifier. The router 300A specifies LIPa of the printer 100A associated with the request identifier included in the response. The router 300A transmits the response to the printer 100A by transmitting the response with the specified LIPa as a destination. The router 300B executes the same operation as the router 300A and relays communication between the devices 100C and the like in the LAN 4B and the Internet 6.

Configuration of Management Server 400

The management server 400 is a server for collecting and managing information (for example, the remaining amount of ink) relating to the printers 100A and the like. The management server 400 provides a service (for example, an ink cartridge delivery service) relating to the printers 100A and the like based on the collected information. The management server 400 is provided on the Internet 6 by a vendor of the printers 100A and the like. In a modification example, the management server 400 may be provided on the Internet 6 by an operator different from the vendor.

The management server 400 includes a network interface 420 and a controller 430. The respective units 420 and 430 are connected through a bus line (not represented by reference numerals). Hereinafter, the interface will be referred to as "I/F". The controller 430 includes a CPU 432 and a memory 434. The CPU 432 executes various processes according to a program 436 stored in the memory 434. The memory 434 is configured by, for example, a volatile memory or a nonvolatile memory. In addition to the program 436, the memory 434 stores a terminal table TB1 and a printer table TB2. In a modification example, the tables TB1 and TB2 may be stored in an external device (for example, another server or an external memory) that is connected to and can communicate with the management server 400.

In the terminal table TB1, information received from a terminal device is registered. Specifically, account information for identifying a user, a GIP address of a terminal device logged into the management server 400, and condition information indicating a registration condition for registering a printer are registered in association with each other. The account information includes a user name and a password.

In the printer table TB2, information received from a printer is mainly registered. Specifically, the device ID, the GIP address of the printer, and the account information are registered in association with each other.

Process Executed by Devices 400 and the Like: FIGS. 2 to 7

Processes executed by the devices 400 and the like will be described with reference to FIGS. 2 to 7. Hereinafter, in the description of processes executed by the CPU 432 of the management server 400 according to the program 436, not the CPU but the management server 400 will be mainly described for easy understanding. In addition, all the communications of the management server 400 are executed through the Internet 6 and the network I/F 420. Accordingly, hereinafter, the description of "through the Internet 6" and "through the network I/F 420" will be omitted.

Figure 2:
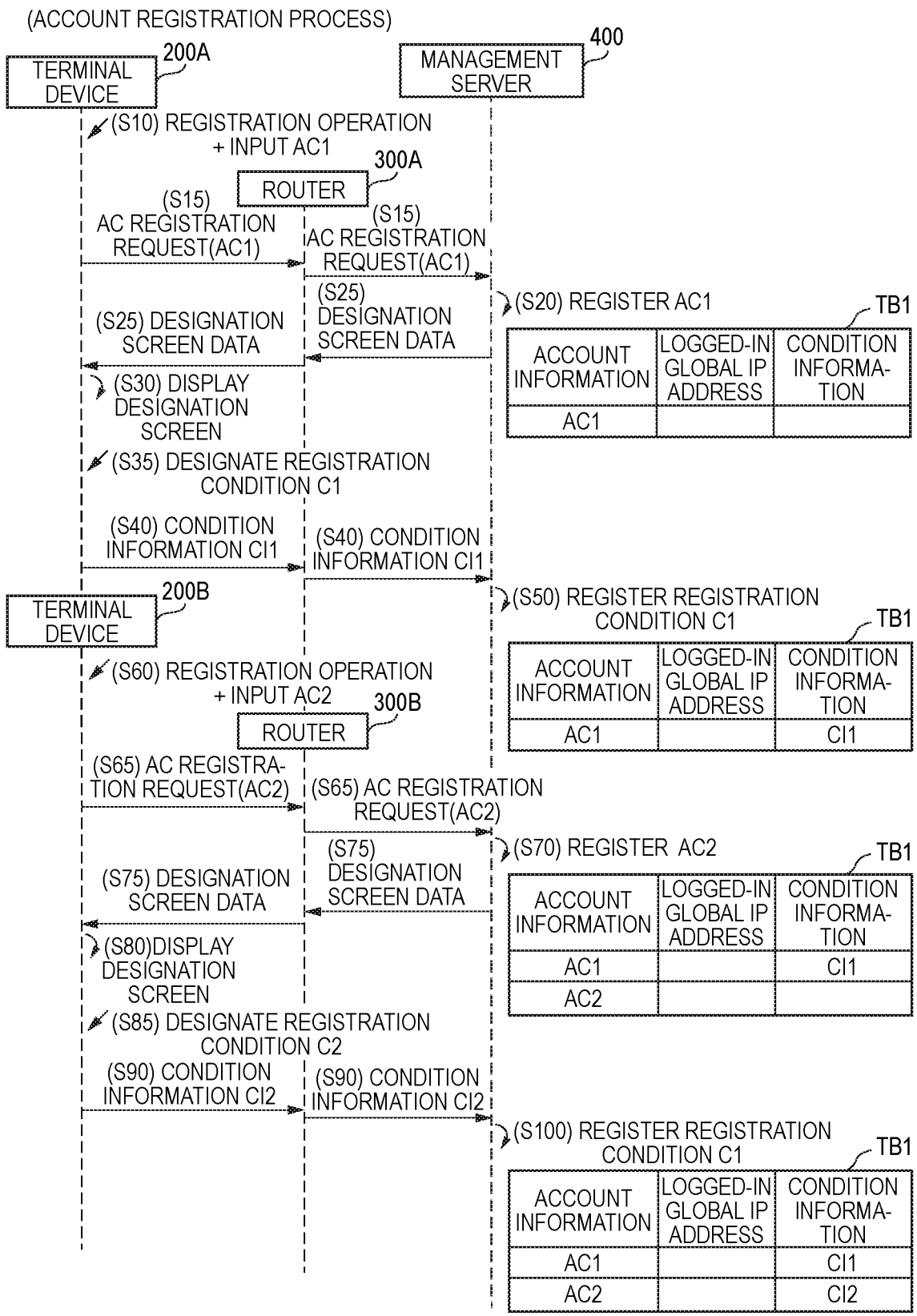
FIG. 2 is a diagram illustrating a sequence of an account registration process.

Account Registration Process: FIG. 2

An account registration process for registering the account information will be described with reference to FIG. 2. The first user causes the terminal device 200A to execute an operation (for example, designation of a URL of the management server 400) for accessing the management server 400. In this case, the terminal device 200A accesses the management server 400 and receives initial screen data indicating an initial screen from the management server 400. In S10, the first user executes a registration operation for registering the account information on the initial screen. In this case, the terminal device 200A requests the management server 400 to transmit registration screen data indicating an account registration screen, and receives the registration screen data from the management server 400. The first user inputs account information AC1 on the account registration screen. In this case, in S15, the terminal device 200A transmits an AC (abbreviation of account) registration request including the account information AC1 to the management server 400 through the router 300A.

When the AC registration request is received from the terminal device 200A, in S20, the management server 400 registers the account information AC1 included in the AC registration request in the terminal table TB1. In S25, the management server 400 transmits designation screen data indicating a designation screen to the terminal device 200A. The designation screen is a screen for designating a registration condition for registering a printer.

Figure 3:
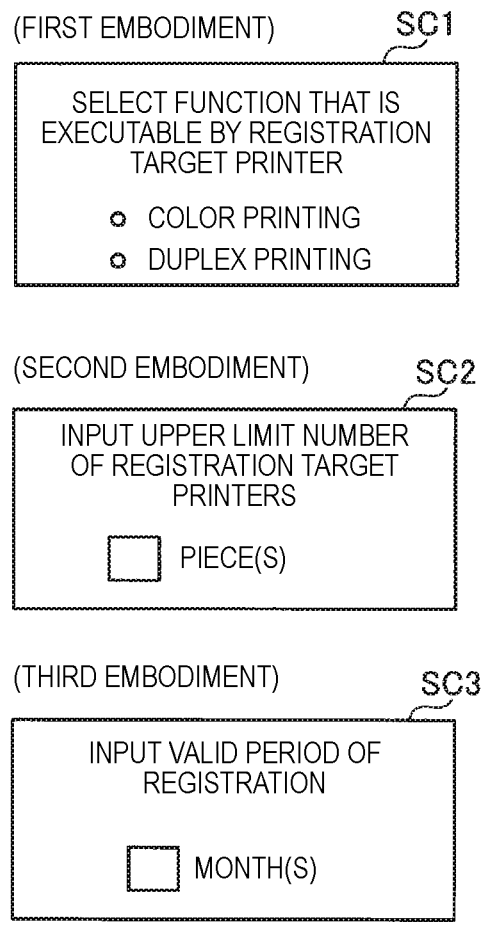
FIG. 3 is diagram illustrating a designation screen displayed on a terminal device.

When the designation screen data is received from the management server 400, in S30, the terminal device 200A displays a designation screen SC1 indicated by the designation screen data. As illustrated in FIG. 3, the designation screen SC1 includes the color printing function and the duplex printing function as options for the function (that is, the registration condition) that is executable by a registration target printer.

In S35, the first user designates a registration condition C1 indicating the color printing function or the duplex printing function on the designation screen SC1 In this case, in S40, the terminal device 200A transmits condition information CI1 indicating the registration condition C1 to the management server 400 through the router 300A.

When the condition information CI1 is received from the terminal device 200A, in S50, the management server 400 registers the condition information CI1 in the terminal table TB1 in association with the account information AC1. This way, using terminal device 200A, the first user can designate the registration condition C1 of a printer to be registered in the management server 400. As a result, the first user can register the account information AC1 of the first user and the condition information CI1 indicating the registration condition C1 in the management server 400 in association with each other.

S60 to S100 are the same as S10 to S60, except that the terminal device 200B and the router 300B are used and that account information AC2 of the second user, a registration condition C2, and condition information CI2 are used. As a result, the second user can register the account information AC2 of the second user and the condition information CI2 indicating the registration condition C2 in the management server 400 in association with each other.

Figure 4:
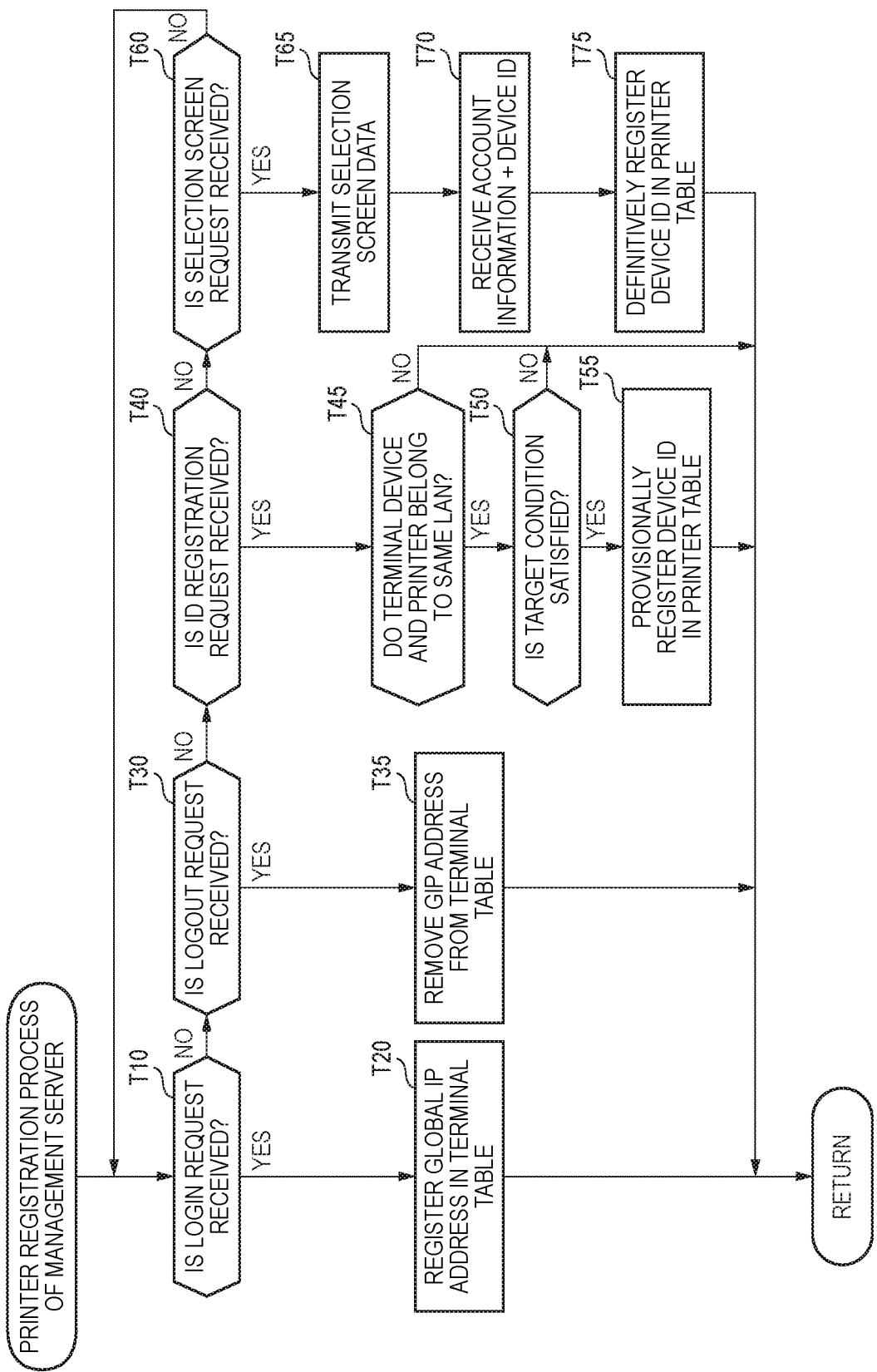
FIG. 4 is a flowchart illustrating a printer registration process.

Printer Registration Process of Server: FIG. 4

Referring to FIG. 4, a printer registration process that is executed by the CPU 432 of the management server 400 according to the program 436 will be described. In T10, when a login request including account information registered in the terminal table TB1 is transmitted from a terminal device, the management server 400 monitors whether or not the login request is received, the login request including: the account information; and a GIP address corresponding to a LAN to which the terminal device belongs. When the login request is received (YES in T10), the management server 400 progresses to T20.

In T20, the management server 400 stores the GIP address included in the login request and the account information included in the login request in the terminal table TB1 in association with each other. As a result, the terminal device that is the source of the login request is logged into the management server 400. When T20 ends, the management server 400 returns to T10.

In T30, when a logout request including account information registered in the terminal table TB1 is transmitted from a terminal device, the management server 400 monitors whether or not the logout request is received, the logout request including: the account information; and a GIP address corresponding to a LAN to which the terminal device belongs. When the logout request is received (YES in T30), the management server 400 progresses to T35.

In T35, the management server 400 removes a GIP address associated with the account information included in the logout request, that is, a GIP address that matches with the GIP address included in the logout request from the terminal table TB1. As a result, the terminal device that is the source of the logout request is logged out from the management server 400. When T35 ends, the management server 400 returns to T10.

In T40, when an ID registration request including a device ID and function information is transmitted from a printer, the management server 400 monitors whether or not an ID registration request is received, the ID registration request including the device ID, the function information, and a GIP address corresponding to a LAN to which the printer belongs. Function information is information indicating a function (that is, the color printing function and/or the duplex printing function) that is executable by a printer. When the ID registration request is received (YES in T40), the management server 400 progresses to T45.

In T45, the management server 400 determines whether or not the LAN to which the logged-in terminal device belongs matches with the LAN to which the printer that is the source of the ID registration request belongs. Specifically, the management server 400 determines whether or not the GIP address (hereinafter, referred to as "target GIP address") included in the ID registration request is stored in the terminal table TB1. When the target GIP address is stored in the terminal table TB1 (YES in T45), the management server 400 progresses to T50. When the target GIP address is not stored in the terminal table TB1 (NO in T45), the management server 400 returns to T10.

In T50, first, the management server 400 specifies a registration condition (hereinafter, referred to as "target condition"), which is indicated by the condition information associated with the target GIP address, from the terminal table TB1. The management server 400 determines whether or not the printer that is the source of the ID registration request satisfies the target condition. Specifically, when the function information included in the ID registration request indicates the function indicated by the target condition, the management server 400 determines that the answer of T50 is YES, and progresses to T55. On the other hand, when the function information included in the ID registration request does not indicate the function indicated by the target condition, the management server 400 determines that the answer of T50 is NO, and returns to T10.

In T55, the management server 400 provisionally registers the device ID and the target GIP address included in the ID registration request in the printer table TB2 in association with each other. The provisional registration represents that the account information is not in association with the device ID and the target GIP address in the printer table TB2. When T55 ends, the management server 400 returns to T10.

In T60, when a selection screen request is transmitted from a terminal device, the management server 400 monitors whether or not the selection screen request including a GIP address corresponding a LAN to which the terminal device belongs is received. When the selection screen request is received (YES in T60), the management server 400 progresses to T65.

In T65, first, the management server 400 specifies the provisionally registered device ID associated with the GIP address included in the selection screen request from the printer table TB2. The management server 400 transmits the selection screen data including the specified device ID with the GIP address included in the selection screen request as a destination. As a result, the selection screen data is transmitted to a terminal device that is the source of the selection screen request. Selection screen data is data indicating a selection screen for allowing the user to select whether or not the provisionally registered device ID is to be definitively registered.

In T70, when the definitive registration of the device ID is selected on the selection screen displayed on the terminal device, the management server 400 receives the account information and the device ID from the terminal device. When the definitive registration of the device ID is not selected on the selection screen displayed on the terminal device, the management server 400 does not receive the account information and the device ID, and thus does not execute T70 and T75.

In T75, the management server 400 definitively registers the device ID received in T70. Specifically, the management server 400 registers the account information received in T70 in the printer table TB2 associated with the device ID received in T70. The definitive registration represents that the account information is in association with the device ID in the printer table TB2. When T75 ends, the management server 400 returns to T10.

Figure 5:
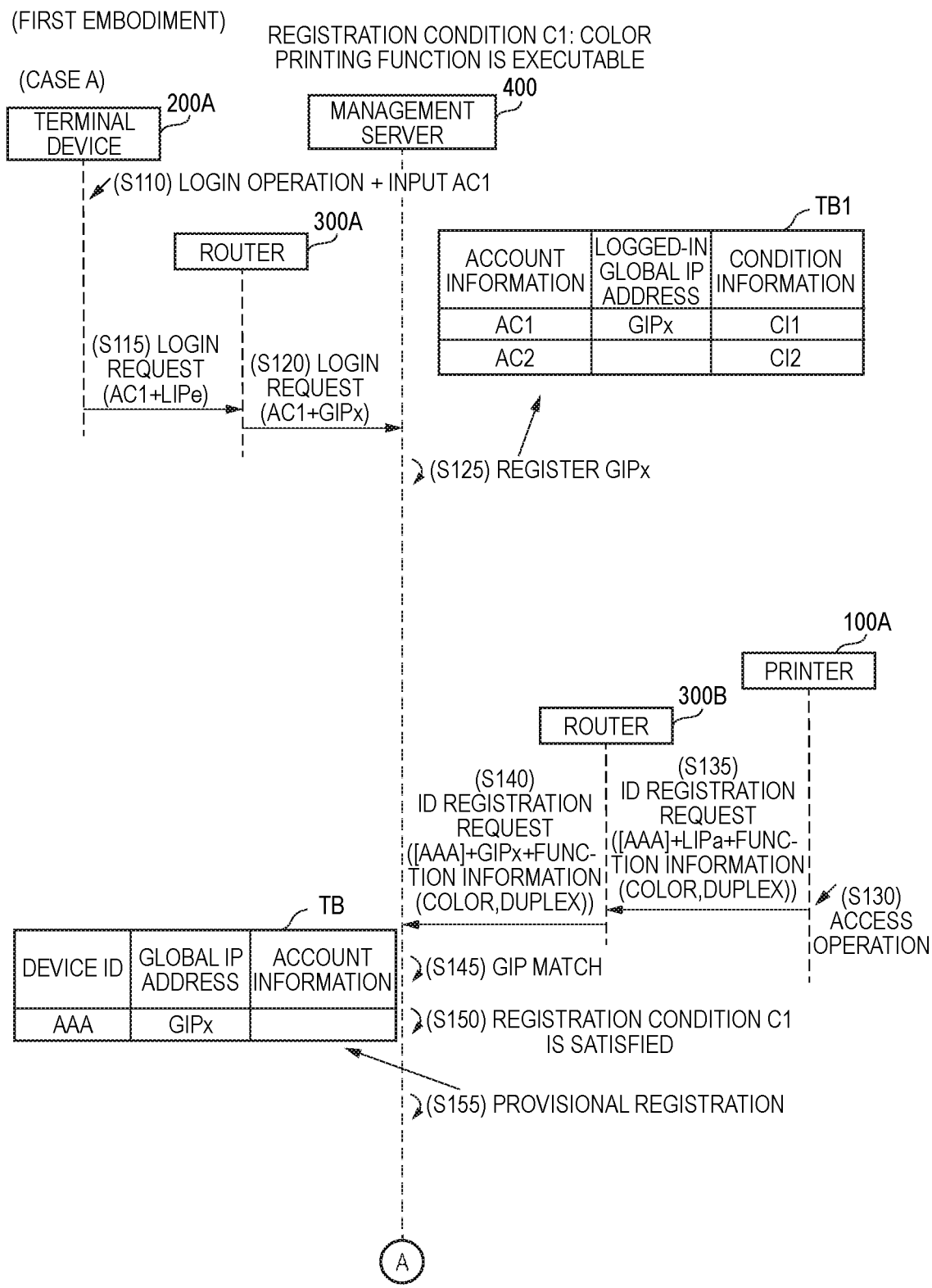
FIG. 5 is a diagram illustrating a sequence of a case A.
Figure 6:
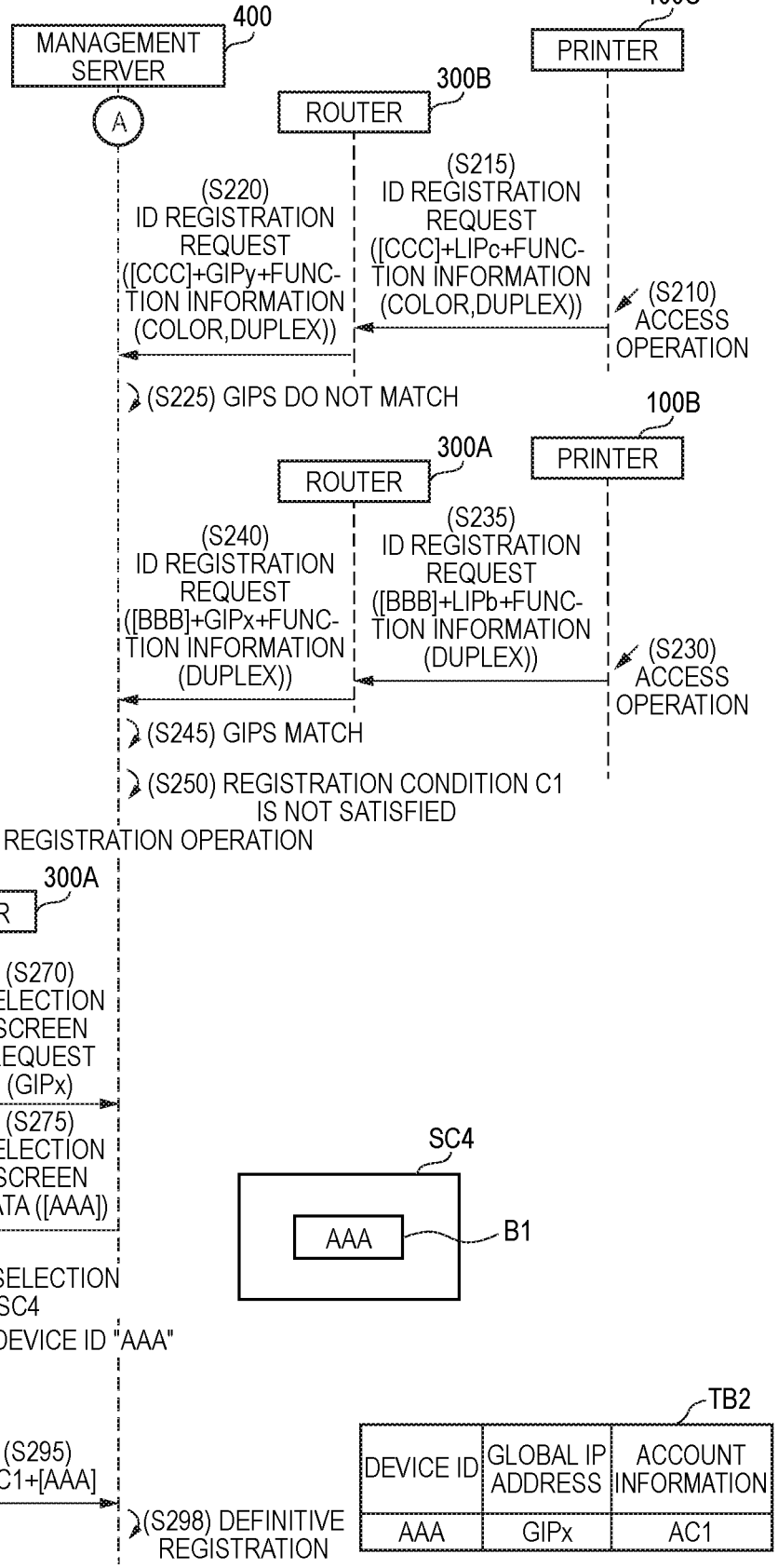
FIG. 6 is a diagram illustrating the sequence following FIG. 5.

Case A: FIGS. 5 and 6

Referring to FIGS. 5 and 6, a case A that is realized by the printer registration process of FIG. 4 will be described. In an initial state of this case, the account registration process of FIG. 2 is completed, and the terminal devices 200A and 200B are not logged into the management server 400.

In S110, the first user causes the terminal device 200A to execute a login operation for receiving login screen data indicating a login screen and to input the account information AC1. The specific process is the same as S10 of FIG. 2, except that the login screen data indicating the login screen is used instead of the registration screen data indicating the registration screen.

In S115, the terminal device 200A transmits a login request including the account information AC1 and LIPe to the router 300A with the URL of the management server 400 as a destination.

When the login request is received from the terminal device 200A, the router 300A converts LIPe included in the login request into GIPx and, in S120, transmits the login request to the management server 400.

When the login request is received from the router 300A (YES in T10 of FIG. 4), in S125, the management server 400 registers GIPx included in the login request in the terminal table B1 in association with the account information AC1 included in the login request (T20).

In S130, the first user causes the printer 100A to execute an access operation for accessing the management server 400. In this case, in S135, the printer 100A transmits an ID registration request including the device ID "AAA", LIPa, and function information to the router 300A with the URL of the management server 400 as a destination. The function information indicates that the printer 100A can execute the color printing and the duplex printing.

When the ID registration request is received from the printer 100A, the router 300A converts LIPa included in the ID registration request into GIPx and, in S140, transmits the ID registration request to the management server 400.

When the ID registration request is received from the router 300A, in S145, the management server 400 determines that GIPx included in the ID registration request is stored in the terminal table TB1 (YES in T45). Next, in S150, first, the management server 400 specifies the registration condition C1, which is indicated by the condition information CI1 associated with GIPx included in the ID registration request, from the terminal table TB1. The registration condition C1 indicates the color printing function. The management server 400 determines that the function information included in the ID registration request indicates the color printing function of the specified registration condition C1 (YES in T50). In this case, in S155, the management server 400 provisionally registers the device ID "AAA" and GIPx included in the ID registration request of S140 in the printer table TB2 in association with each other.

S210 to S220 of FIG. 6 are the same as S130 to S140 of FIG. 5, except that the printer 100C and the router 300B are used and that the device ID "CCC", LIPc, and GIPy are used. When the ID registration request is received from the router 300A, in S225, the management server 400 determines that GIPy included in the ID registration request is not stored in the terminal table TB1 (NO in T45). Therefore, the device ID "CCC" and GIPy are not provisionally registered in the printer table TB2.

S230 to S240 are the same as S130 to S140 of FIG. 5, except that the printer 100B is used, that the device ID "BBB" and LIPb are used, and that function information not indicating the color printing function is used. When the ID registration request is received from the router 300A, in S245, the management server 400 determines that GIPx included in the ID registration request is stored in the terminal table TB1 (YES in T45). Next, in S250, the management server 400 determines that the function information included in the ID registration request does not satisfy the registration condition C1 because the function information does not indicate the color printing function (NO in T50). Therefore, the device ID "BBB" and GIPx are not provisionally registered in the printer table TB2.

In S260, in a state where the terminal device 200A is logged into the management server 400 (refer to S125 of FIG. 5), the first user causes the terminal device 200A to execute a printer registration operation for definitively registering the device ID. In this case, in S265, the terminal device 200A transmits the selection screen request including LIPe to the router 300A with the URL of the management server 400 as a destination.

When the selection screen request is received from the terminal device 200A, the router 300A stores the request identifier for identifying the selection screen request and LIPe included in the selection screen request in association with each other, and converts LIPe into GIPx. In S270, the router 300A transmits the selection screen request including the request identifier and GIPx to the management server 400.

When the selection screen request is received from the router 300A (YES in T60 of FIG. 4), in S275, first, the management server 400 specifies the provisionally registered device ID "AAA" associated with GIPx included in the selection screen request from the printer table TB2. The management server 400 transmits the selection screen data including the request identifier included in the selection screen request and the specified device ID "AAA" to the router 300A with GIPx included in the selection screen request as a destination (T65).

When the selection screen data is received from the management server 400, the router 300A specifies LIPe associated with the request identifier included in the selection screen data. In S280, the router 300A transmits the selection screen data to the terminal device 200A with the specified LIPe as a destination.

When the selection screen data is received from the router 300A, in S285, in S285, the terminal device 200A displays a selection screen SC4 indicated by the selection screen data. The selection screen SC4 includes a button B1 for selecting the definitive registration of the device ID "AAA". In S290, the user causes the terminal device 200A to execute an operation of selecting the button B1. In this case, in S293, the terminal device 200A transmits the account information AC1 and the device ID "AAA" to the router 300A with the URL of the management server 400 as a destination. This way, before definitively registering the device ID "AAA", the user can select whether or not the device ID "AAA" is to be definitively registered on the selection screen SC4. As a result, the definitive registration of a device ID that is not desired to be definitively registered is suppressed by the user.

When the account information AC1 and the device ID "AAA" are received from the terminal device 200A, in S295, the router 300A transmits the account information AC1 and the device ID "AAA" to the management server 400.

When the account information AC1 and the device ID "AAA" are received from the router 300A (T70 of FIG. 4), in S298, the management server 400 registers the account information AC1 in the printer table TB2 in association with the device ID "AAA". As a result, the device ID "AAA" is definitively registered (T75).

It is assumed that the registration condition C1 indicates not the color printing function but the duplex printing function. In this case, in S250 of FIG. 6, the management server 400 determines that the function information satisfies the registration condition (YES in T50 of FIG. 4) and provisionally registers the device ID "BBB" and GIPx in the printer table TB2. In S275, the management server 400 transmits the selection screen data including the devices IDs "AAA" and "BBB". As a result, the selection screen displayed in S285 includes not only the button B1 but also a button for selecting the definitive registration of the device ID "BBB". In S290, the user selects both the devices IDs "AAA" and "BBB". As a result, in S298, both the devices IDs "AAA" and "BBB" are definitively registered.

Effect of Case A

According to the embodiment, the management server 400 does not automatically register the devices IDs "AAA" and "BBB" of the printers 100A and 100B belonging to the same LAN as the terminal device 200A, and changes whether or not the devices IDs "AAA" and "BBB" are to be registered depending on whether or not the printers 100A and 100B satisfy the registration condition C1 (S298 in FIG. 6). That is, the management server 400 registers the device ID "AAA" of the printer 100A that satisfies the registration condition C1 indicating the color printing function, but does not register the device ID "BBB" of the printer 100B that does not satisfy the registration condition C1. Accordingly, the management server 400 can appropriately execute the registration according to the registration condition C1.

In addition, in the embodiment, the management server 400 receives the login request from the terminal device 200A before receiving the ID registration request from each of the printers 100A, 100B, and 100C (S120 of FIG. 5). Instead of this configuration, a configuration of a comparative example in which the management server 400 receives the ID registration request from each of the printers 100A, 100B, and 100C is assumed. In the configuration of the comparative example, when the ID registration request is received, the logged-in GIP address is not registered in the terminal table TB1. Therefore, the management server 400 cannot execute the determinations of S145 of FIG. 5 and S225 and S245 of FIG. 6. Accordingly, the management server 400 executes the determinations of S145 and the like when the login request is received after provisionally registering all the devices IDs "AAA", "BBB" and "CCC" in advance. It is necessary to provisionally register all the devices IDs "AAA", "BBB", and "CCC", and thus the amount of information to be stored by the management server 400 is large. On the other hand, in the embodiment, the management server 400 receives the ID registration request from each of the printers 100A and the like after receiving the login request from the terminal device 200A (S140 of FIG. 5 and S220 and S240 of FIG. 6). Therefore, the management server 400 can execute the determinations of S145 and the like when the ID registration request is received. Thus, only the device ID "AAA" is provisionally registered (S155). Accordingly, the amount of information to be stored by the management server 400 can be reduced as compared to the configuration of the comparative example.

Although not illustrated in the drawings, an example of an execution process of the management server 400 using the definitively registered device ID "AAA" will be described. The management server 400 establishes XMPP (abbreviation of eXtensible Messaging and Presence Protocol) connection, which is so-called always-on connection, with the printer 100A. The management server 400 transmits an ink remaining amount information request to the printer 100A using the established XMPP connection, and receives a response including the device ID "AAA" and ink remaining amount information from the printer 100A. When the remaining amount of ink indicated by the ink remaining amount information is a predetermined value or less, the management server 400 executes a service of delivering an ink cartridge to the first user. Specifically, the management server 400 specifies the account information AC1 associated with the device ID "AAA" in the printer table TB2, and delivers the ink cartridge using user information (not illustrated; for example, a name or an address of the user) associated with the account information AC1. This way, by definitively registering the device ID "AAA", the management server 400 can collect information from the printer 100A and manage the collected information and further can execute a service using the information.

Figure 7:
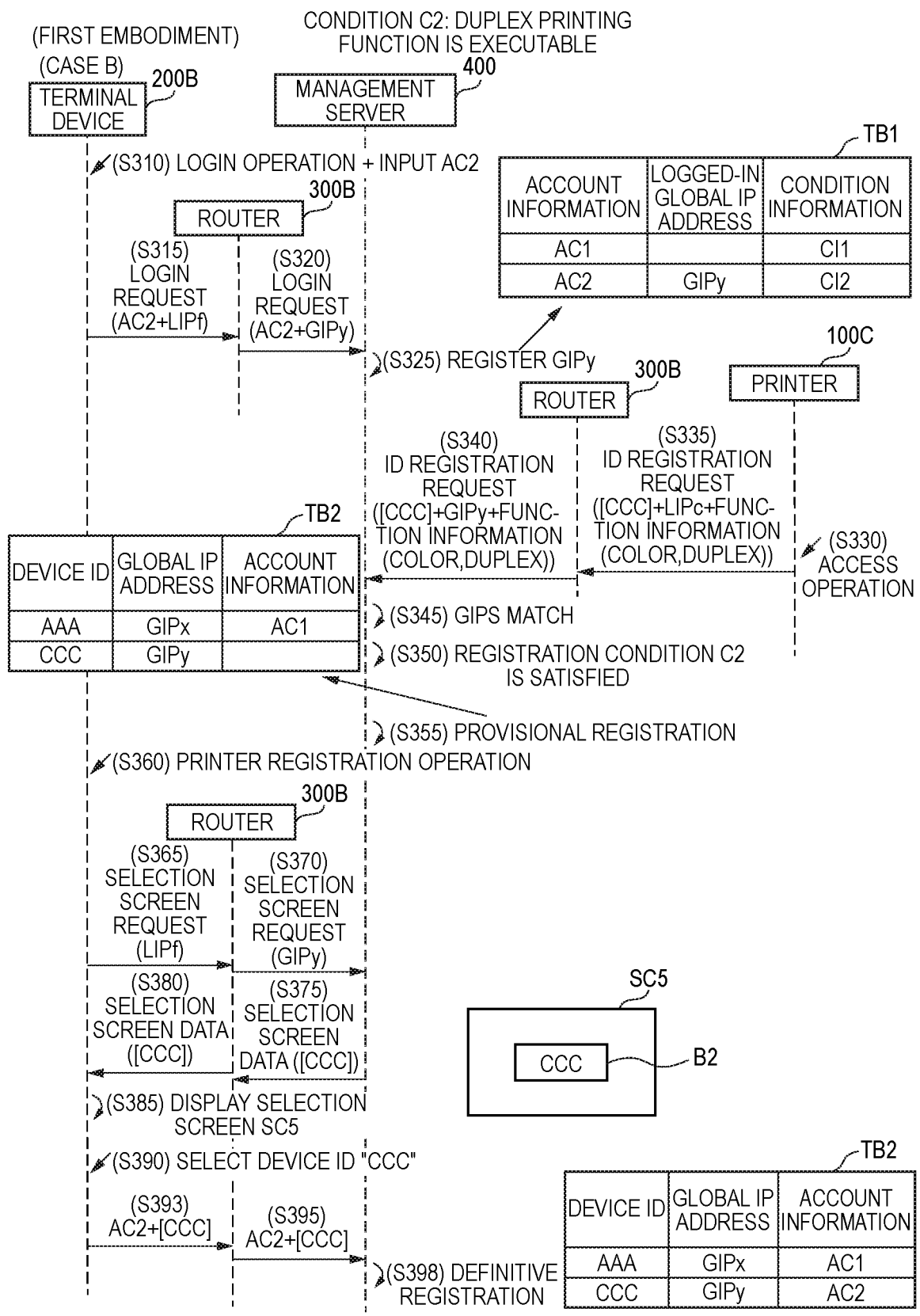
FIG. 7 is a diagram illustrating a sequence of a case B realized after the case A.

Case B: FIG. 7

Referring to FIG. 7, a case B that is realized after the case A will be described. In S310, the second user causes the terminal device 200B to execute the login operation and to input the account information AC2. The specific process is the same as S110 of FIG. 5, except that the terminal device 200B is used and that the account information AC2 is used. In this case, in S315, the terminal device 200B transmits a login request including the account information AC2 and LIPf to the router 300B with the URL of the management server 400 as a destination.

When the login request is received from the terminal device 200B, the router 300B converts LIPf included in the login request into GIPy and, in S320, transmits the login request to the management server 400.

When the login request is received from the router 300B (YES in T10 of FIG. 4), in S325, the management server 400 registers GIPy included in the login request in the terminal table B1 in association with the account information AC2 included in the login request (T20).

S330 to S340 are the same as S210 to S220 of FIG. 6. In S345, the management server 400 determines that GIPy included in the ID registration request is stored in the terminal table TB1 (YES in T45 of FIG. 4). In S350, the management server 400 determines that the function information included in the ID registration request indicates the duplex printing function indicated by the registration condition C2 (YES in T50). In this case, in S355, the management server 400 provisionally registers the device ID "CCC" and GIPy included in the ID registration request in the printer table TB2 in association with each other.

S360 to S380 are the same as S260 to S280 of FIG. 6, except that the terminal device 200B and the router 300B are used and that LIPf, GIPy, and the device ID "CCC" are used.

In S385, the terminal device 200B displays a selection screen SC5 indicated by the selection screen data. The selection screen SC5 includes a button B2 for selecting the definitive registration of the device ID "CCC". In S390, the user causes the terminal device 200B to execute an operation of selecting the button B2. In this case, in S393, the terminal device 200B transmits the account information AC2 and the device ID "CCC" to the router 300B with the URL of the management server 400 as a destination.

When the account information AC2 and the device ID "CCC" are received from the terminal device 200B, in S395, the router 300B transmits the account information AC2 and the device ID "CCC" to the management server 400.

When the account information AC2 and the device ID "CCC" are received from the router 300B (T70 of FIG. 4), in S398, the management server 400 registers the account information AC2 in the printer table TB2 in association with the device ID "CCC". As a result, the device ID "CCC" is definitively registered (T75).

In the case not illustrated in the drawing, it is assumed that the user executes an access operation for accessing the printer 100D after S355. In this case, the management server 400 receives an ID registration request including the device ID "DDD", GIPy, and function information. The management server 400 determines that GIPy included in the ID registration request is stored in the terminal table TB1 (YES in T45 of FIG. 4), and determines that the function information included in the ID registration request does not satisfy the registration condition C2 because the function information does not indicate the duplex printing function (NO in T50). As a result, the management server 400 does not provisionally register the device ID "DDD".

Effect of Case B

According to the case B, when the printer 100C satisfies the registration condition C2, the management server 400 registers the device ID "CCC" in association with the account information AC2 (S398 of FIG. 7). The registration condition C2 that indicates the duplex printing function is a condition different from the registration condition C1 that indicates the color printing function corresponding to the account information AC1 of the case A. That is, the management server 400 can register the device ID using the registration condition for each user.

Correspondence

The terminal device 200A is an example of "first terminal device" and "specific terminal device". The terminal device 200B is an example of "second terminal device". The printers 100A to 100C are an example of "first function execution device" and "second function execution device". The account information pieces AC1 and AC2 are examples of "first authentication information" and "second authentication information", respectively. The devices IDs "AAA", "BBB", and "CCC" are examples of "first identification information" and "second identification information". The registration conditions C1 and C2 are examples of "first registration condition" and "second registration condition". The LAN 4A is an example of "first local area network". The LANs 4A and 4B are examples of "second local area network". The LAN 4B is an example of "third local area network". The LANs 4A and 4B are examples of "fourth local area network" and "specific local area network". IPx is an example of "first global IP address". IPx and IPy are examples of "second global IP address". IPy is an example of "third global IP address". IPx and IPy are examples of "fourth global IP address" and "specific global IP address". The ID registration request is an example of "first registration request" and "second registration request". The color printing function is an example of "specific function".

Second Embodiment

Different points from the first embodiment will be described. A registration condition of the embodiment is an upper limit number of printers that are registrable in association with one piece of account information. In S40 and S78 of FIG. 2, a designation screen SC2 is displayed instead of the designation screen SC1 of FIG. 3, and in S45 and S80, the upper limit number of printers that are registrable in association with one piece of account information is designated.

In the embodiment, the function information is not used. Therefore, the ID registration request of T40 of FIG. 4 does not include the function information. In addition, in T50, first, the management server 400 specifies account information associated with the target GIP address included in the ID registration request from the terminal table TB1. The management server 400 determines whether or not the number of printers that are definitively registered in association with the specified account information is the upper limit number. When the number of definitively registered printers does not reach the upper limit number, the management server 400 determines that the answer of T50 is YES. When the number of definitively registered printers reaches the upper limit number, the management server 400 determines that the answer of T50 is NO.

Figure 8:
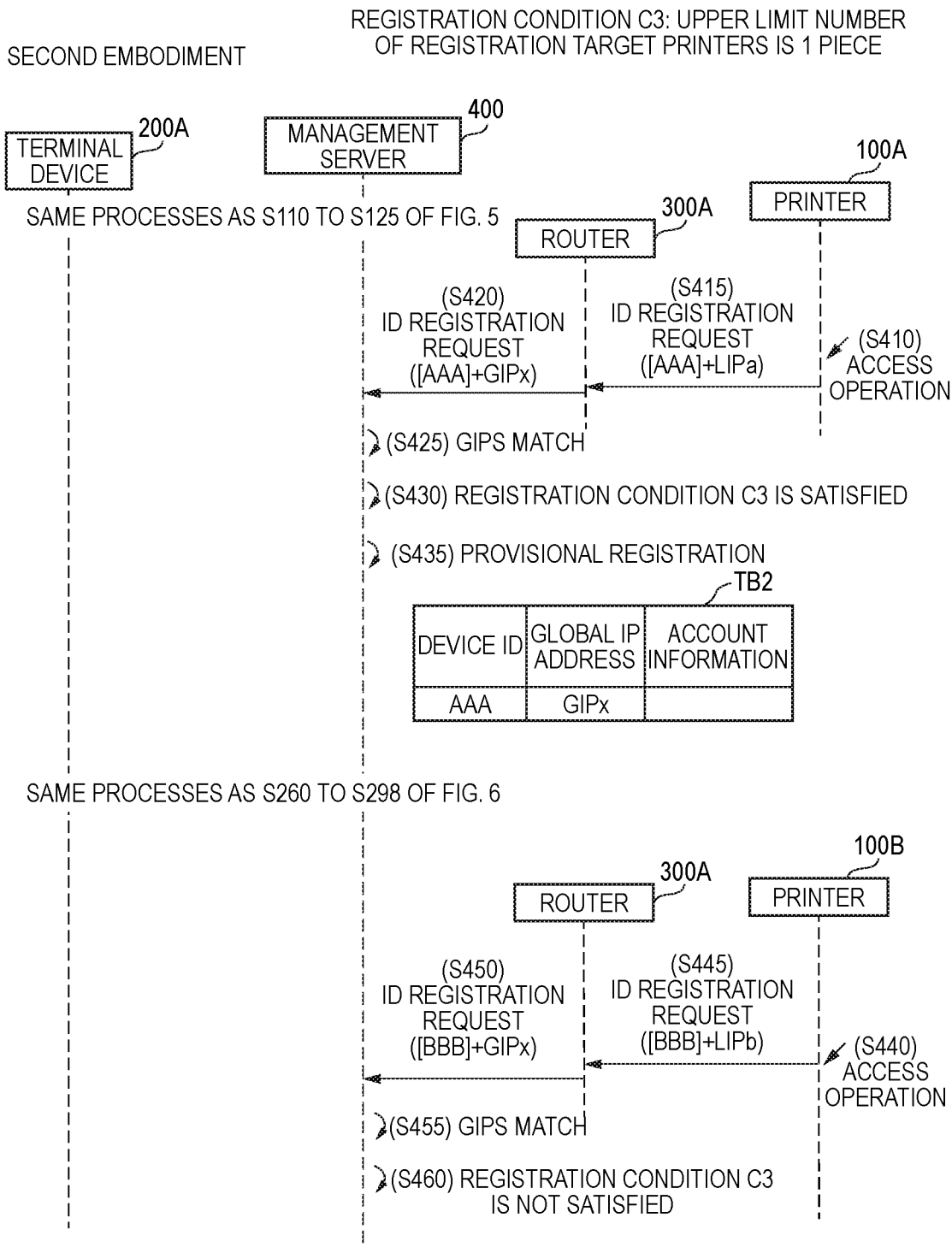
FIG. 8 is a diagram illustrating a sequence of a second embodiment.

Specific Case: FIG. 8

Referring to FIG. 8, a specific case that is realized by the printer registration process of FIG. 4 will be described. An initial state of the case is the same as the initial state of the case A of FIG. 5. In the case, in S45 of FIG. 2, the user designates a condition that one or less printer is registrable in association with the account information AC1 as a registration condition C3.

First, the same processes as S110 to S125 of FIG. 5 are executed. S410 to S425 are the same as S130 to S145 of FIG. 5, except that the ID registration request does not include function information. In S430, the management server 400 specifies the account information AC1 that is registered in the terminal table TB1 in association with GIPx included in the ID registration request. The management server 400 determines that the number of printers registered in the printer table TB2 in association with the specified account information AC1 does not reach the upper limit number "1" (YES in T50). S435 is the same as S155 of FIG. 5. The same processes as S260 to S298 of FIG. 6 are executed.

S440 to S455 are the same as S230 to S245 of FIG. 6, except that the ID registration request does not include function information. In S460, the management server 400 specifies the account information AC1 that is registered in the terminal table TB1 in association with GIPx included in the ID registration request. The management server 400 determines that the number of printers registered in the printer table TB2 in association with the specified account information AC1 reaches the upper limit number "1" (NO in T50). As a result, the management server 400 does not provisionally register the device ID "BBB".

Effect of Second Embodiment

In the embodiment, as in the first embodiment, the registration can be appropriately executed according to the registration condition C3. In addition, the amount of information to be stored by the management server 400 can be reduced. In addition, when a service provided by the management server 400 is paid for, the management server 400 charges the user for the service. In the embodiment, the upper limit number of printers that are registrable in association with each piece of account information is designated (S45 and S80 of FIG. 2). Therefore, the management server 400 can charge a fee corresponding to the upper limit number to the user.

Third Embodiment

Different points from the first embodiment will be described. A registration condition of the embodiment is a valid period during which a printer is registrable in association with account information. The valid period is a period starting from a timing at which account information is registered. In S25 and S70 of FIG. 2, the management server 400 stores the present time in the memory 434 as a timing at which the account information pieces AC1 and AC2 are registered. In S40 and S78 of FIG. 2, a designation screen SC3 is displayed instead of the designation screen SC1 of FIG. 3, and in S45 and S80, the valid period is designated. The valid period may be a period starting from a timing at which a printer initially accesses the management server 400.

In the embodiment, the function information is not used. Therefore, the ID registration request of T40 of FIG. 4 does not include the function information. In addition, in T50, the management server 400 determines whether or not a timing at which the ID registration request is received is within the valid period. Specifically, the management server 400 specifies account information that is registered in the terminal table TB1 in association with the target GIP address included in the ID registration request. The management server 400 determines whether or not the timing at which the ID registration request is received is within the valid period after a timing at which the specified account information is registered. When the timing at which the ID registration request is received is within the valid period, the management server 400 determines that the answer of T50 is YES. When the timing at which the ID registration request is received is not within the valid period, the management server 400 determines that the answer of T50 is NO.

Figure 9:
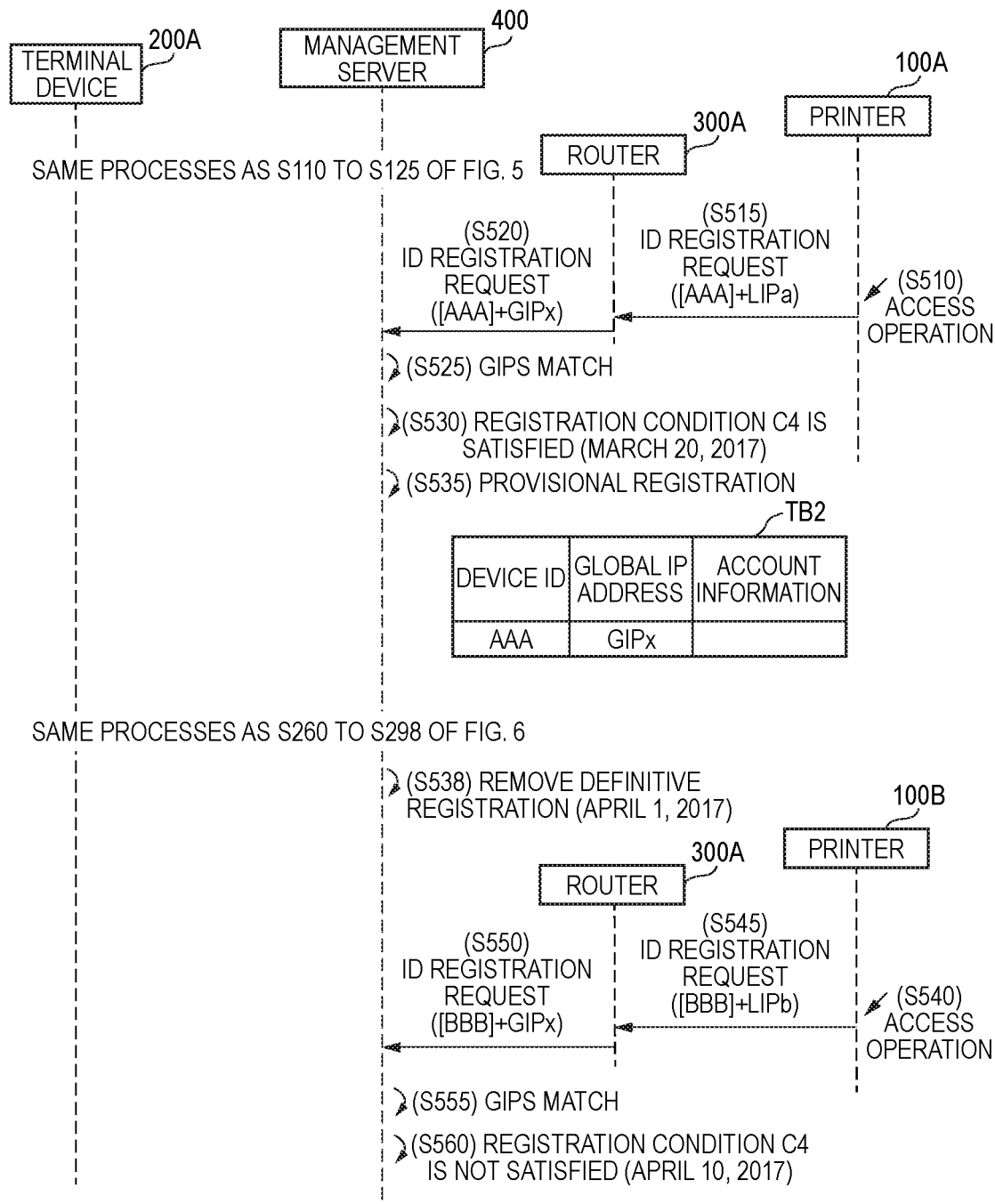
FIG. 9 is a diagram illustrating a sequence of a third embodiment.

Specific Case: FIG. 9

Referring to FIG. 9, a specific case that is realized by the printer registration process of FIG. 4 will be described. An initial state of the case is the same as the initial state of the case A of FIG. 5. A timing at which the account information is registered in S25 of FIG. 2 is Mar. 1, 2017. In addition, in S45 of FIG. 2, the user designates a condition that a valid period during which a printer is registrable in association with the account information AC1 is one month as a registration condition C4.

First, the same processes as S110 to S125 of FIG. 5 are executed. S510 to S525 are the same as S130 to S145 of FIG. 5, except that the ID registration request does not include function information. In S530, the management server 400 specifies the account information AC1 that is registered in the terminal table TB1 in association with GIPx included in the ID registration request. The management server 400 determines that the timing (Mar. 20, 2017) at which the ID registration request of S520 is received is within one month after the timing (Mar. 1, 2017) at which the specified account information is registered (YES in T50). S535 is the same as S155 of FIG. 5. The same processes as S260 to S298 of FIG. 6 are executed. In S538, the management server 400 removes the definitively registered device ID "AAA", GIPx, and the account information AC1 at a timing (Apr. 1, 2017) at which the valid period is expired. In a modification example, S538 is not necessarily executed.

S540 to S555 are the same as S230 to S245 of FIG. 6, except that the ID registration request does not include function information. In S560, the management server 400 specifies the account information AC1 that is registered in the terminal table TB1 in association with GIPx included in the ID registration request. The management server 400 determines that the timing (Apr. 10, 2017) at which the ID registration request of S550 is received is not within one month after the timing (Mar. 1, 2017) at which the specified account information is registered (NO in T50).

Effect of Third Embodiment

In the embodiment, as in the first embodiment, the registration can be appropriately executed according to the registration condition C4. In addition, the amount of information to be stored by the management server 400 can be reduced. In addition, when a service provided by the management server 400 is paid for, the management server 400 charges the user for the service. In the embodiment, the valid period during which a printer is registrable in association with account information is designated (S45 and S80 of FIG. 2). Therefore, the management server 400 can charge a fee corresponding to the valid period to the user.

Hereinafter, the specific examples of the present invention have been described in detail. However, these examples are merely exemplary and do not limit the claims. The techniques described in the claims include various modifications and changes of the above-described specific examples. Modification examples of the embodiments will be described below.

Modification Example 1

S30 to S60 and S73 to S90 of FIG. 2 are not necessarily executed. In addition, when it is determined that the answer of T45 of FIG. 4 is YES, the management server 400 may skip T50 of FIG. 4 and progress to T55. That is, "first condition determining unit" is not necessarily provided.

Modification Example 2

In S25 and S70 of FIG. 2, the management server 400 may generate access tokens corresponding to the account information pieces AC1 and AC2, and may register the access tokens in the terminal table TB1 instead of the account information pieces AC1 and AC2. The management server 400 may transmit the access tokens to the terminal devices 200A and 200B. In the processes of FIGS. 4 to 9, the access tokens may be used instead of the account information. That is, "first authentication information" and "second authentication information" may be the access tokens.

Modification Example 3

A unique GIP address may be assigned to each of the devices 100A and the like belonging to the LAN 4A. For example, a GIP address range (that is, "129.123.123.0" to "129.123.123.255") that is usable by the router 300A may be assigned to the router 300A. "129.123.123.0" to "129.123.123.3" may be assigned to the devices 100A and the like belonging to the LAN 4A. A network address of a global network of the LAN 4A is "129.123". Likewise, a unique GIP address may be assigned to each of the devices 100C and the like belonging to the LAN 4B. In the modification example, the management server 400 may execute the following execution in T45 of FIG. 4. The management server 400 transmits a request including a target GIP address to a WHOIS server, and receives a network address of the target GIP address from the WHOIS server. Likewise, the management server 400 transmits one or more requests including one or more GIP addresses that are stored in the terminal table TB1 to the WHOIS server, and receives one or more network addresses of one or more GIP addresses from the WHOIS server. When the network address of the target GIP address matches with any one of the one or more target network addresses, the management server 400 determines that the answer of T45 is YES. On the other hand, when the network address of the target GIP address does not match with any one of the one or more network GIP addresses, the management server 400 determines that the answer of T45 is NO. That is, "first network determining unit" may determine whether or not the first local area network and the second local area network match with each other based on whether or not the network address of the first global IP address and the network address of the second global IP address match with each other.

Modification Example 4

As described above, a specific configuration in which the ID registration request of S140 of FIG. 5 and S220 and S240 of FIG. 6 is received before receiving the login request of S120 of FIG. 5 may be adopted. That is, "first registration request receiving unit" may receive the first registration request before receiving the first login request.

Modification Example 5

Each of the account information pieces AC1 and AC2 may be registered in the terminal table TB1 by inputting the account information to the management server 400 by a manager of the management server 400. In addition, in each of the embodiments, the registration condition is designated by the user (S45 and S80 of FIG. 2). However, in the modification example, the registration condition may be automatically designated by the management server 400. That is, at least one of "authentication registration request receiving unit", "screen data transmitting unit", "condition information receiving unit", or "storage controller" is not necessarily provided.

Modification Example 6

S15 to S60 of FIG. 2 may be executed using a device different from the terminal device 200A instead of the terminal device 200A. That is, "specific terminal device" may be a device different from the terminal device 200A.

Modification Example 7

In the first embodiment, the ID registration request (T40 of FIG. 4) may include a model name of a printer instead of the function information. In this case, the management server 400 stores information indicating a function that is executable by a printer in association with a model name of the printer in advance. When the ID registration request including the model name is received from the printer (YES in T40), the management server 400 may execute T50 using the information associated with the model name. That is, "function information" may be a model name.

Modification Example 8

In the modification example 5 in which the registration condition is automatically designated by the management server 400, the registration conditions corresponding to the account information pieces AC1 and AC2 may be the same. That is, the second registration condition may be the same as the first registration condition. In addition, at least one of "second login request receiving unit", "second registration request receiving unit", "second network determining unit", "second condition determining unit", or "second registering unit" is not necessarily provided.

Modification Example 9

The management server 400 may definitively register the device ID in T55 of FIG. 4 and does not necessarily execute T60 to T75. That is, "selection screen transmitting unit" and "selection result information receiving unit" are not necessarily provided.

Modification Example 10

The management server 400 does not necessarily execute T35 of FIG. 4. That is, even when a terminal device is logged out, the management server 400 does not necessarily remove a GIP address of the terminal device from the terminal table TB1. In this case, the management server 400 may provisionally register a printer ID of a printer belonging to the same LAN as the logged-out terminal device (T55).

Modification Example 11

Each of "first function execution device" and "second function execution device" is not limited to printers and may be a scanner, a multi-function peripheral, a fax machine, or the like.

Modification Example 12

In the embodiments, each of the processes of FIGS. 2 and 4 to 9 is realized by software (that is, a program). However, at least one of the processes may be realized by hardware such as a logic circuit.

In addition, the technical features described in this specification or the drawings exhibit the technical utility solely or by various combinations, and are not limited to the combination of the claims of the application. In addition, the techniques exemplified in this specification or the drawings may attain multiple purposes at the same time, and the technical utility may be obtained by attaining one of the purposes.

What is claimed is:

1. A server comprising:
a controller;
a memory storing first authentication information and first condition information in association with each other, the first condition information indicating a first image processing function for registering an image processing device;
the controller configured to perform:
receiving, in response to transmission of the first authentication information from a first terminal device, through the Internet, a first login request including the first authentication information and a first global IP address, the first global IP address being assigned to a first router corresponding to a first local area network, the first terminal device belonging to the first local area network of the first router;
receiving, in response to transmission of first identification information for identifying a first image processing device from the first image processing device, through the Internet, a first registration request including the first identification information and a second global IP address, the second global IP address being assigned to a second router corresponding to a second local area network, the first image processing device belonging to the second local area network of the second router;
determining, in a case where the first login request is received and in a case where the first registration request is received, whether or not the first local area network and the second local area network match with each other based on the first global IP address included in the first login request and the second global IP address included in the first registration request;
determining, in a case where the first login request is received and in a case where the first registration request is received, whether or not the first image processing device supports the first image processing function based on the first condition information, the first condition information being stored in the memory in association with the first authentication information included in the first login request; and
registering, in a case where it is determined that the first local area network and the second local area network match with each other and the first image processing device supports the first image processing function, the first identification information included in the first registration request in the memory in association with the first global IP address,
wherein, in a case where it is determined that the first local area network and the second local area network do not match with each other, the first identification information is not registered in the memory, and wherein, in a case where it is determined that the first image processing device does not support the first image processing function, the first identification information is not registered in the memory.

2. The server according to claim 1, wherein, after the first login request is received, the controller receives the first registration request.

3. The server according to claim 1, wherein the controller is further configured to perform:
receiving, before the first login request is received and the first registration request is received, through the Internet, an authentication registration request for requesting registration of the first authentication information from a specific terminal device;
transmitting, in a case where the authentication registration request is received from the specific terminal device, through the Internet, designation screen data indicating a designation screen to the specific terminal device, the designation screen being a screen for designating an image processing function for registering an image processing device;
receiving, in a case where the first image processing function is designated on the designation screen, through the Internet, the first condition information from the specific terminal device; and
storing, in a case where the first condition information is received from the specific terminal device, the first authentication information and the first condition information in the memory in association with each other.

4. The server according to claim 1,
wherein the first image processing function includes a condition whether a specific image processing function is executable by an image processing device,
wherein the first registration request further includes function information indicating an image processing function that is executable by the first image processing device, and
wherein the controller:
determines, in a case where the function information included in the first registration request indicates that the specific image processing function is executable, that the first image processing device supports the first image processing function; and
determines, in a case where the function information included in the first registration request indicates the specific image processing function that the specific function is not executable, that the first image processing device does not support the first image processing function.

5. The server according to claim 1,
wherein the first image processing function includes a condition where an upper limit number of image processing devices that are registrable in association with the first authentication information is set, and
wherein the controller:
determines, in a case where the number of image processing devices registered in association with the first authentication information does not reach the upper limit number, that the first image processing device supports the first image processing function, and
determines, in a case where the number of image processing devices registered in association with the first authentication information reaches the upper limit number, that the first image processing device does not support the first image processing function.

6. The server according to claim 1,
wherein the first image processing function includes a condition where a period during which an image processing device is registrable in association with the first authentication information is set, and
wherein the controller:
determines, in a case where a timing at which the first registration request is received is within the period, that the first image processing device supports the first image processing function, and
determines, in a case where a timing at which the first registration request is received is out of the period, that the first image processing device does not support the first image processing function.

7. The server according to claim 1,
wherein second authentication information and second condition information are stored in the memory in association with each other, the second authentication information being different from the first authentication information, and the second condition information indicating a second image processing function for registering an image processing device that is different from the first image processing function, and
wherein the controller further performs operations comprising:
receiving, in response to transmission of the second authentication information from a second terminal device, through the Internet, a second login request including the second authentication information and a third global IP address that corresponds to a third local area network, to which the second terminal device belongs;
receiving, in response to transmission of second identification information for identifying a second image processing device from the second image processing device, through the Internet, a second registration request including the second identification information and a fourth global IP address that corresponds to a fourth local area network, to which the second image processing device belongs;
determining, in a case where the second login request is received and the second registration request is received, whether or not the third local area network and the fourth local area network match with each other based on the third global IP address included in the second login request and the fourth global IP address included in the second registration request;
determining, in a case where the second login request and the second registration request are received, whether or not the second image processing device supports the second image processing function based on the second condition information stored in the memory in association with the second authentication information included in the second login request; and
registering, in a case where it is determined that the third local area network and the fourth local area network match with each other and the second image processing device supports the second image processing function, the second identification information included in the second registration request in the memory in association with the second authentication information;
wherein, in a case where it is determined that the third local area network and the fourth local area network do not match with each other, register the second identification information is not registered in the memory; and,
wherein, in a case where it is determined that the second image processing device does not support the second image processing function, the second identification information is not registered in the memory.

8. A server comprising:
a controller;
memory storing first authentication information;
the controller configured to perform:
receiving, in response to transmission of the first authentication information from a first terminal device, through the Internet, a first login request including the first authentication information and a first global IP address, the first global IP address being assigned to a first router corresponding to a first local area network, the first terminal device belonging to the first local area network of the first router;
receiving, in response to transmission of first identification information for identifying a first image processing device from the first image processing device after the first login request is received, through the Internet, a first registration request including the first identification information and a second global IP address, the second global IP address being assigned to a second router corresponding to a second local area network, the first image processing device belonging to the second local area network of the second router;
determining, in a case where the first login request is received and in a case where the first registration request is received, whether or not the first local area network and the second local area network match with each other based on the first global IP address included in the first login request and the second global IP address included in the first registration request;
registering, in a case where it is determined that the first local area network and the second local area network match with each other, the first identification information included in the first registration request in the memory in association with the first global IP address, wherein, in a case where it is determined that the first local area network and the second local area network do not match with each other, the first identification information is not registered in the memory;
receiving, through the Internet in a case where second identification information for identifying a second image processing device is transmitted from the second image processing device after the first login request is received, a second registration request, the second registration request including the second identification information and a specific global IP address, a specific global IP address being assigned to a specific router corresponding to a specific local area network, the second image processing device belonging to the specific local area network of the specific router; and
determining, in a case where the first login request and the second registration request are received, whether or not the first local area network and the specific local area network match with each other based on the first global IP address included in the first login request and the specific global IP address included in the second registration request; and
wherein, in a case where it is determined that the first local area network and the specific local area network match with each other, the second identification information included in the second registration request is registered in the memory in association with the first global IP address,
wherein, in a case where it is determined that the first local area network and the specific local area network do not match with each other, the second identification information is not registered in the memory.

9. The server according to claim 8, wherein the controller further performs operations comprising:
transmitting, in a case where it is determined that the first local area network and the second local area network match with each other, through the Internet, selection screen data indicating a selection screen to the first terminal device, the selection screen being a screen for selecting whether or not the first identification information is to be registered; and
receiving, after the selection screen data is transmitted from the first terminal device, through the Internet, selection result information from the first terminal device, the selection result information indicating whether or not the first identification information is to be registered,
wherein, in a case where the selection result information indicates that the first identification information is to be registered, the first identification information is registered in the memory in association with the first authentication information; and
wherein, in a case where the selection result information indicates that the first identification information is not to be registered, the first identification information is not registered in the memory.

10. The server according to claim 8, wherein the controller further performs operations comprising:
transmitting, in a case where it is determined that the first local area network and the second local area network match with each other, through the Internet, selection screen data indicating a selection screen to the first terminal device, the selection screen being a screen for selecting whether or not the first identification information is to be registered; and
receiving, after the selection screen data is transmitted from the first terminal device, through the Internet, selection result information from the first terminal device, the selection result information indicating whether or not the first identification information is to be registered,
wherein, in a case where the selection result information indicates that the first identification information is to be registered, the first identification information is registered in the memory in association with the first authentication information, and
wherein, in a case where the selection result information indicates that the first identification information is not to be registered, the first identification information is not registered in the memory.

11. The server according to claim 8,
wherein at least one of a printing function or a scanning function is executable by the first image processing device.

12. The server according to claim 8,
wherein at least one of a printing function or a scanning function is executable by the first image processing device.

13. A non-transitory computer-readable medium having instructions to control a computer of a server, the instructions causing the server to perform operations comprising:
receiving, in response to transmission of the first authentication information from a first terminal device, through the Internet, a first login request including the first authentication information and a first global IP address, the first global IP being assigned to a first router corresponding to a first local area network, the first terminal device belonging to the first local area network of the first router;

receiving, in response to transmission of first identification information for identifying a first image processing device from the first image processing device, through the Internet, a first registration request including the first identification information and a second global IP address, the second global IP address being assigned to a second router corresponding to a second local area network, the first image processing device belonging to the second local area network of the second router;

determining, in a case where the first login request is received and in a case where the first registration request is received, whether or not the first local area network and the second local area network match with each other based on the first global IP address included in the first login request and the second global IP address included in the first registration request;

determining, in a case where the first login request is received and in a case where the first registration request is received, whether or not the first image processing device supports the first image processing function indicated by the first condition information based on the first condition information, the first condition information being stored in the memory of the server in association with the first authentication information included in the first login request, the first registration condition is a condition for registering an image processing device, registering, in a case where it is determined that the first local area network and the second local area network match with each other and the first image processing device supports the first image processing function, the first identification information included in the first registration request in the memory in association with the first global IP address, wherein, in a case where it is determined that the first local area network and the second local area network do not match with each other, the first identification information is not registered in the memory, and wherein, in a case where it is determined that the first image processing device does not support the first image processing function, the first identification information is not registered in the memory.

14. A non-transitory computer-readable medium having instructions to control a computer of a server, the instructions causing the server to perform operations comprising:

receiving, in response to transmission of the first authentication information from a first terminal device, through the Internet, a first login request including the first authentication information and a first global IP address, the first global IP address being assigned to a first router corresponding to a first local area network, the first terminal device belongs to the first local area network of the first router;

receiving, in response to transmission of first identification information for identifying a first image processing device from the first image processing device after the first login request is received, through the Internet, a first registration request including the first identification information and a second global IP address, the second global IP address being assigned to a second router corresponding to a second local area network, the first image processing device belonging to the second local area network of the second router;

determining, in a case where the first login request is received and in a case where the first registration request is received, whether or not the first local area network and the second local area network match with each other based on the first global IP address included in the first login request and the second global IP address included in the first registration request, wherein, in a case where it is determined that the first local area network and the second local area network match with each other, the first identification information included in the first registration request is registered in the memory in association with the first global IP address, and, in a case where it is determined that the first local area network and the second local area network do not match with each other, the first identification information is not register in the memory;

receiving, through the Internet in a case where second identification information for identifying a second image processing device is transmitted from the second image processing device after the first login request is received, a second registration request, the second registration request including the second identification information and a specific global IP address, the specific global IP address being assigned to a specific router corresponding to a specific local area network, the second image processing device belonging to the specific local area network of the specific router;

determining, in a case where the first login request and the second registration request are received, whether or not the first local area network and the specific local area network match with each other based on the first global IP address included in the first login request and the specific global IP address included in the second registration request; and registering, in a case where it is determined that the first local area network and the specific local area network match with each other, the second identification information included in the second registration request is registered in the memory in association with the first global IP address; wherein, in a case where it is determined that the first local area network and the specific local area network do not match with each other, the second identification information is not registered in the memory.

* * * * *

UNITED STATES PATENT AND TRADEMARK OFFICE
CERTIFICATE OF CORRECTION

| | |
|---|---|
| PATENT NO. | : 11,151,242 B2 |
| APPLICATION NO. | : 15/938146 |
| DATED | : October 19, 2021 |
| INVENTOR(S) | : Satoshi Watanabe |

It is certified that error appears in the above-identified patent and that said Letters Patent is hereby corrected as shown below:

In the Claims

Column 19, Claim 4, Line 33 should read:
condition where a specific image processing function Column 19, Claim 4, Lines 47-49 should read:
included in the first registration request indicates that the specific image processing function Column 21, Claim 8, Line 48 should read:
information and a specific global IP address, the specific Column 23, Claim 14, Line 55 should read:
the first terminal device belonging to the first local area Signed and Sealed this
Twelfth Day of April, 2022

Drew Hirshfeld
*Performing the Functions and Duties of the
Under Secretary of Commerce for Intellectual Property and
Director of the United States Patent and Trademark Office*